United States Patent [19]

Tokumasu et al.

[11] 4,337,097
[45] Jun. 29, 1982

[54] METHOD FOR MAKING A SELECTIVE ABSORPTION FILM FOR SOLAR ENERGY

[75] Inventors: Hiroyuki Tokumasu, Hirakata; Hideo Uchino, Higashi-Osaka; Shiro Hozumi, Sakai, all of Japan

[73] Assignee: Matsushita Electric Industrial Company, Limited, Osaka, Japan

[21] Appl. No.: 219,427

[22] Filed: Dec. 23, 1980

[30] Foreign Application Priority Data

Dec. 28, 1979 [JP] Japan .............................. 54-171151
Dec. 28, 1979 [JP] Japan .............................. 54-171152

[51] Int. Cl.$^3$ ............................. C23F 7/06; C23F 7/14
[52] U.S. Cl. ............................... 148/6.15 R; 148/6.27
[58] Field of Search .................... 148/6.27, 6.15 R; 427/160

[56] References Cited

U.S. PATENT DOCUMENTS

| | | | |
|---|---|---|---|
| 2,234,206 | 3/1941 | Thompson | 148/6.15 R |
| 3,395,053 | 7/1968 | Wakelyn | 148/6.27 |
| 3,819,424 | 6/1974 | Russell et al. | 148/6.15 R |
| 4,148,670 | 4/1979 | Kelly | 148/6.15 R |

FOREIGN PATENT DOCUMENTS 51-106647 9/1976 Japan .............................. 148/6.27

Primary Examiner—Ralph S. Kendall
Attorney, Agent, or Firm—Lowe, King, Price & Becker

[57] ABSTRACT

A method for making a selective absorption film for solar energy which comprises immersing aluminum or its alloy in water which contains at least two members selected from phosphate ions, fluoride ions and triethanolamine, and optionally ions of a metal selected from copper, iron, cobalt, silver and a mixture thereof thereby forming a chemical conversion film which shows a great absorptivity and a small emissivity.

10 Claims, 6 Drawing Figures

METHOD FOR MAKING A SELECTIVE ABSORPTION FILM FOR SOLAR ENERGY

BACKGROUND OF THE INVENTION

1. Field of the Invention

This invention relates to a method for making a selective absorption film for solar energy which is able to absorb the solar energy efficiently with a reduced loss of once stored heat energy.

2. Description of the Prior Art

The importance of use of solar energy is growing because of the recent, world-wide, difficult energy conditions. In order to effectively utilize the solar energy, there are needed selective solar energy absorption films showing excellent absorption characteristics, i.e. absorption films which exhibit a large absorptivity $\alpha$ in the wavelength range of visible and near infrared light (0.3–2$\mu$) which occupies most of the solar energy and particularly the solar spectrum and which show a small emissivity $\epsilon$ in the radiation range (2–20 $\mu$m) of once stored heat energy.

Known methods of making such selective absorption films of the just-mentioned type include a method of electroplating copper plates with black chromium, black nickel, etc., a chemical conversion method in which oxide films are formed on plates of iron, stainless steel and copper, a method of forming a color-anodized aluminium, a painting or coating method using black paints, and a vacuum deposition and CVD method of interference multi-layer laminates. However, the absorption films obtained by these methods do not always show good selective absorption characteristics and some may present a problem of durability. Further, all of these methods involve some drawbacks from a view point of cost in that treating processes are complicated, that the treating steps are too many in number, and the treating efficiency is low.

On the other hand, it is known to form a black covering or coating on aluminium surfaces by a chemical conversion technique. This technique is simpler than the above-described methods of making selective absorption films. In addition, since such a black coating is able to absorb sunlight in a greater degree, the chemical conversion of aluminium is considered as a simple method for making such a selective absorption method. In this connection, however, known aluminium chemical conversion methods capable of yielding black coatings or films which make use of, for example, potassium permanganate, nickel sulfate, or ammonium molybdate have a disadvantage that the films obtained by these methods exhibit an absorptivity $\alpha$ of above 0.6 and an undesirably high emissivity $\epsilon$ of above 0.3 and are thus rather poor in selective absorption characteristics. Accordingly, these methods are not considered useful in making a solar energy absorption film.

SUMMARY OF THE INVENTION

It is therefore an object of the present invention to provide a method for making a selective absorption film for solar energy by a simple chemical conversion treatment.

It is another object of the invention to provide a method for making a selective solar energy absorption film which is low in treating cost.

It is a further object of the invention to make a selective solar energy absorption film which shows excellent selective absorption characteristics.

The above objects can be achieved by a method according to the invention which comprises immersing aluminium or its alloy in water which contains at least two members selected from the group consisting of phosphate ions, fluoride ions and triethanolamine. In a preferred aspect, the water further contains ions of a metal selected from the group consisting of copper, iron, cobalt and silver and a mixture thereof. As a result, a chemical conversion film is formed on the aluminium or its alloy.

EMBODIMENTS OF THE INVENTION

Figure 1:
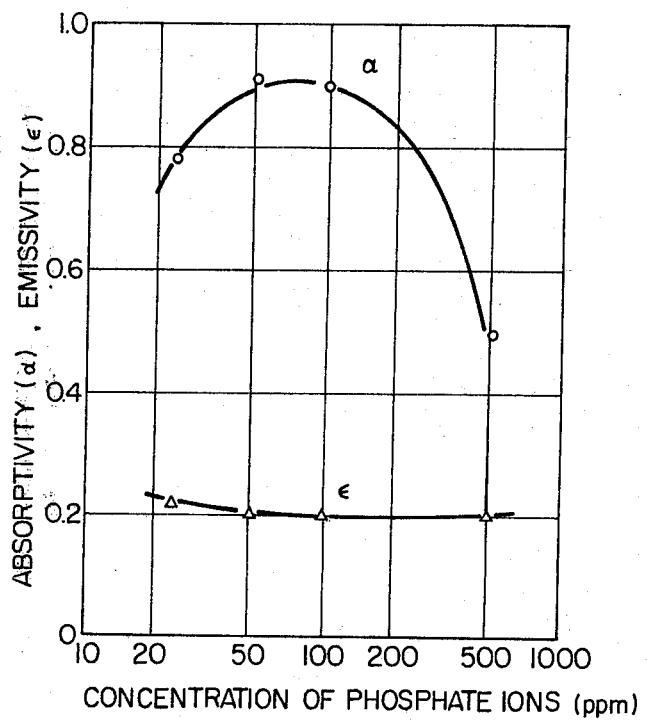
FIG. 1 is a graphical representation of an absorptivity and an emissivity of a chemical conversion film in relation to variation in concentration of phosphate ions in a two-components system.

As described hereinbefore, the present invention is characterized by immersing aluminium or an alloy thereof in water which contains at least two members selected from the group consisting of phosphate ions, fluoride ions and triethanolamine or optionally further contains ions of a metal selected from the group consisting of copper, iron, cobalt, silver and a mixture thereof.

The immersion is usually conducted at temperatures of 80° C. or greater, preferably 95° C. or more for a period of 10 minutes or longer, preferably above 20 minutes.

Compounds capable of yielding phosphate ions which are used in the practice of the invention as being dissolved in water include, for example, $H_3PO_4$, sodium salts such as $Na_3PO_4$, $Na_2HPO_4$, $NaH_2PO_4$ and the like, and corresponding potassium and ammonium salts. Similarly, compounds capable of yielding fluoride ions include NaF, KF and $NH_4F$.

On the other hand, compounds capable of yielding metal ions useful in the invention are those which show a great solubility in water and include chlorides such as $CuCl_2$, $FeCl_3$, $CoCl_2$ and the like, nitrates such as $Cu(NO_3)_2$, $Fe(NO_3)_3$, $Co(NO_3)_2$, $AgNO_3$ and the like, and sulfates such as $CuSO_4$, $Fe_2(SO_4)_3$, $CoSO_4$ and the like.

When triethanolamine is used, no specific adjustment of pH of the immersion system is required since the pH is determined depending on the concentration of triethanolamine. In the absence of triethanolamine, NaOH or HCl may be added to adjust the pH to a predetermined level. In general, the pH is in the range of 9.1 to 10.2.

In order to obtain a chemical conversion film according to the method of the invention, aluminium or its alloy is subjected to a pretreatment and an aftertreatment prior to and after the chemical conversion treatment of the invention similarly to the case of an ordinary chemical conversion treatment. The pretreatment is desired to involve, after ordinary defatting and washing, a mirror finishing of aluminium or its alloy by chemical or electrolytic polishing so as to suppress an increase of the emissivity. The aftertreatment includes washing with water and drying and is desired to include removal of deposits on the surface by a simple manner, if necessary.

In a preferred aspect, a three-components system of the fluoride and phosphate ions and triethanolamine are used since the absorption characteristics are superior to those of the two-components system as will be discussed in detail. The ions of a metal defined hereinbefore are also preferably used in combination with the three-component system rather than the two-component system due to excellency in absorption characteristics though the two-component system is usable irrespective of the presence of the metal ions.

Suitable concentrations of the individual components are not mentioned here but will be discussed in detail with reference to the accompanying drawings.

The metals which can be suitably treated by the method of the invention are, as mentioned hereinbefore, aluminium or its alloy which contains very small amount of ordinary employed metals such as Si, Fe, Cu, Mn, Mg, Cr, Ni, Zn, Ti and the like. These metals are usually used in the form of a plate, a sheet, or any other forms as is known in the art.

The present invention will be particularly described by way of the following examples.

EXAMPLE 1

Al 1100 (having an Al content of 99.0 or more % by weight) which had been defatted and washed as usual was immersed in water, which contained 1.0% of triethanolamine and different amounts of $Na_2HPO_4$, at 100° C. for 30 minutes. The resulting chemical conversion films were each subjected to a measurement of an absorptivity $\alpha$ and an emissivity $\epsilon$. The results are shown in FIG. 1 in which the absorptivity and emissivity are represented in relation to a concentration of phosphate ions.

As is clearly seen from FIG. 1, when the concentration of phosphate ions is changed, the emissivity $\epsilon$ is held almost constant but the absorptivity $\alpha$ greatly varies. That is, a good or acceptable absorptivity $\alpha$ is obtained when the concentration of phosphate ions is in the range of 20–300 ppm. Similar results are obtained when using fluoride ions instead of phosphate ions.

EXAMPLE 2

Example 1 was repeated except that the concentration of phosphate ions was held constant and different concentrations of triethanolamine were used, and that two types of alloys, i.e. Al 1100 and Al 1070 (containing 99.7 wt% or more of Al) were used.

Figure 2:
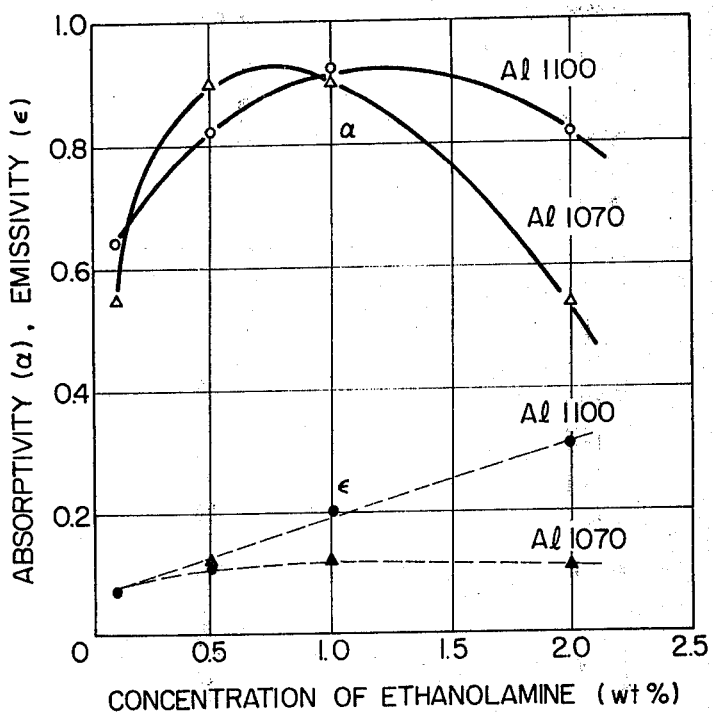
FIG. 2 is a graphical representation of an absorptivity and an emissivity in relation to variation in concentration of triethanolamine for different Al alloys.

The results are shown in FIG. 2, from which it will be clearly seen that though the optimum ranges of concentration of triethanolamine depend, in a slight degree, upon the type of the alloy, good results are obtained when the concentration of triethanolamine is in the range of 0.2–2 wt%.

When the treating time is also determined, it is found that the absorptivity reaches above 0.8 when the treating time is over 10–20 minutes and it is preferably over 20 minutes.

An increase of the treating temperature shows a tendency of increasing both the absorptivity $\alpha$ and emissivity $\epsilon$ and good results are obtained at temperatures of 80° C. and preferably 95° C. or greater.

The absorption film obtained after the immersion is ready for use after mere washing with water and drying without resorting to any further specific after-treatment.

The best absorption film obtained by these immersion systems shows an absorptivity $\alpha$ of 0.90 and an emissivity $\alpha$ of 0.12 for Al 1070 and an absorptivity of 0.92 and an emissivity $\epsilon$ of 0.20 for Al 1100.

Examples 3–13 and References 1 and 2

Mirror-finished Al 1070 plates were immersed in different treating baths at 100° C. for 30 minutes. In these examples and references, phosphate ions, fluoride ions and silver ions were yielded by dissolving $Na_2HPO_4$, NaF and silver nitrate in water, respectively, and the other metal ions were yielded by dissolving corresponding chlorides in water.

The bath compositions and the selective absorption characteristics of the resulting chemical conversion films are shown in Table below.

TABLE

| | | Treating Bath | | | | | Selective Absorption Characteristics | |
|---|---|---|---|---|---|---|---|---|
| | | $PO_4^{3-}$ (ppm) | $F^-$ (ppm) | triethanol-amine (wt %) | metal ions (ppm) | pH | Absorptivity ($\alpha$) | Emissivity ($\epsilon$) |
| Reference | 1 | 0 | 50 | 0 | — | 6.1 | 0.60 | 0.30 |
| | 2 | 50 | 0 | 0 | — | 10.5 | 0.30 | 0.10 |
| | 3 | 0 | 50 | 0.5 | — | 9.1 | 0.77 | 0.25 |
| | 4 | 50 | 0 | 0.5 | — | 9.1 | 0.82 | 0.13 |
| | 5 | 50 | 50 | 0 | — | 10.2 | 0.65 | 0.15 |
| Inventive Examples | 6 | 50 | 50 | 0.5 | — | 9.1 | 0.85 | 0.08 |
| | 7 | 0 | 50 | 0.5 | $Cu^{2+}$ 50 | 9.1 | 0.79 | 0.21 |
| | 8 | 50 | 0 | 0.5 | " | 9.1 | 0.86 | 0.03 |
| | 9 | 50 | 50 | 0 | " | 10.2 | 0.67 | 0.23 |
| | 10 | 50 | 50 | 0.5 | " | 9.1 | 0.91 | 0.09 |
| | 11 | 50 | 50 | 0.5 | $Fe^{3+}$ 50 | 9.1 | 0.91 | 0.13 |
| | 12 | 50 | 50 | 0.5 | $Co^{2+}$ 50 | 9.1 | 0.86 | 0.11 |
| | 13 | 50 | 50 | 0.5 | $Ag^+$ 50 | 9.1 | 0.88 | 0.19 |

As is apparent from the table, the absorption characteristics of the references using phosphate and fluoride ions singly are much poorer than those of Examples 3, 4 and 5 in which two components are used. Further, the characteristics of Example 6 using three components of phosphate ions, fluoride ions and triethanolamine are superior to those of the two-component Examples. This is applied to the case of the three-component systems using the metal ions (see Examples 7, 8 and 9). The characteristics of the four-component systems are very excellent as is clear from the results of Examples 10 through 13.

In general, the sunlight absorption characteristics of the absorption films obtained by such a chemical conversion treatment are considered to be ascribed, to an extent, to fine particles of metals or metal compounds and particularly colored oxides which are finely deposited on the aluminium surface. Among the three or four components in the bath, the metal ions are believed to be a source for these fine particles. The other remaining components are believed to behave almost similarly, i.e. they act to etch the aluminium surfaces, form a thin film, and deposit fine particles. In particular, triethanolamine shows such actions in a greater degree since it can form complexes with metal ions and aluminium. Presumably, this is why the selective absorption characteristics of the samples which have been obtained from the triethanolamine-free baths are poorer. In view of the capability of forming these complex salts, ordinary complex ion-forming agents and chelating agents other than triethanolamine are considered usable, amine compounds such as monoethanolamine and diethanolamine are suitable since they have both the etching and film-forming abilities. The results of the absorption characteristics of the table reveal that the phosphate ions are more active than the fluoride ions.

The treatment in the bath containing four components is more excellent in selective absorption characteristics than that in the bath of the three-component system and thus the use of the treating bath of the four-component system is preferable (see Examples 10–13).

The metal ions useful in the invention are those of copper, iron, cobalt, silver and manganese, of which copper ions are best. Asides, though ions of metals which are more noble than aluminium are theoretically considered usable in making the absorption film, good characteristics could not be obtained when ordinarily employed zinc, nickel, lead, tin and the like were used.

An optimum concentration of each component in the four-components system was determined in such a way that one component was varied in concentration while keeping the concentrations of the other components constant.

Figure 3:
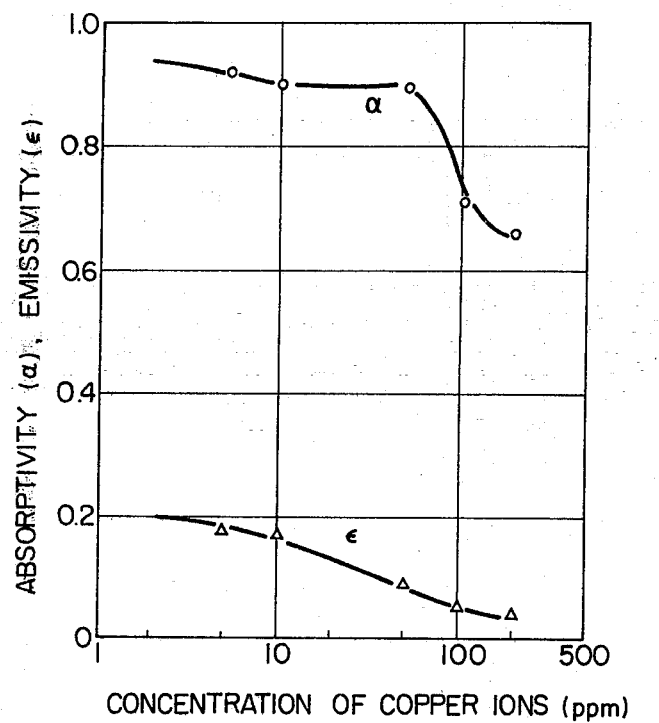
FIG. 3 is similar to FIGS. 1 and 2 and shows a relation between the absorptivity and emissivity and a concentration of copper ions in a four-components system.

FIG. 3 shows an absorptivity $\alpha$ and an emissivity $\epsilon$ in relation to a variation in concentration of copper ions where concentrations of phosphate ions, fluoride ions and triethanolamine are held constant at 50 ppm, 50 ppm and 0.5 wt%, respectively. The bath temperature and the immersion time are 100° C. and 30 minutes, respectively.

From the results of FIG. 3, it will be clear that an optimum range of the concentration is 5–100 ppm. Similar results are obtained when using other metal ions.

Figure 4:
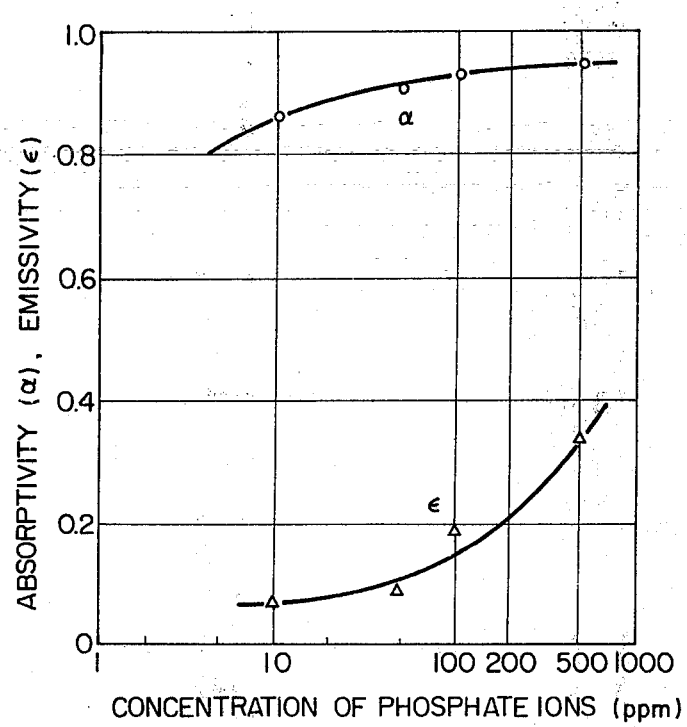
FIGS. 4 through 6 are similar to FIG. 3 but concentrations of fluoride ions, phosphate ions and triethanolamine are varied, respectively.
Figure 5:
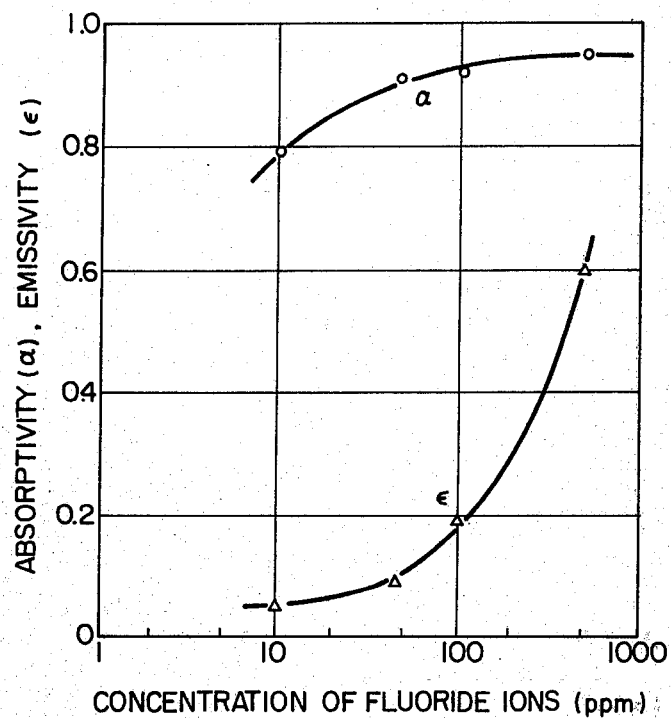
Figure 6:
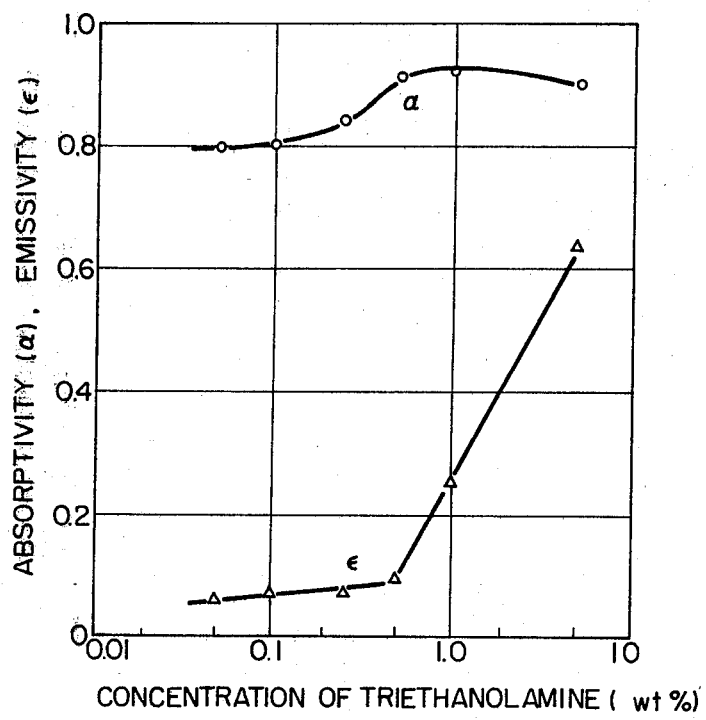

FIGS. 4 through 6 are similar to FIG. 3 but the concentration of phosphate ions are varied while keeping constant the concentration of flouride ions at 50 ppm, that of triethanolamine at 0.5 wt%, and that of copper ions at 50 ppm in FIG. 4, the concentration of fluoride ions are varied while keeping constant the concentration of phosphate ions at 50 ppm, that of triethanolamine at 0.5 wt%, and that of copper ions at 50 in FIG. 5, and the concentration of triethanolamine is varied while keeping constant all the concentrations of phosphate ions, fluoride ions and copper ions at 50 ppm.

From the results of these figures, it is seen that ranges of concentration of these components which ensure good absorption characteristics, i.e. an absorptivity, $\alpha$ of above 0.6, preferably above 0.7 and an emissivity $\epsilon$ of below 0.2, are from 10 ppm to 200 ppm for the phosphate ions, from 10 ppm to 100 ppm for the fluoride ions, and from 0.05 wt% to 1.0 wt% for triethanolamine.

Further, good results are obtained when a pH is weakly alkaline and in the range of 9.1–10.2 of the treating baths as determined with relation to FIGS. 4 through 6.

A reason why the characteristics deteriorated at concentrations of any components higher than certain levels is considered due to an increasing roughness of the metal surface and also due to a metal coloring caused by precipitation of metal.

While certain representative examples and details have been shown for the purpose of illustrating the invention, it will be apparent to those skilled in the art that various changes and modifications may be made without departing from the scope of the invention.

What is claimed is:

1. A method for the production of a selective absorption film for solar energy which comprises immersing aluminium or its alloy in water solution which consists essentially of at least two members selected from the group consisting of phosphate ions, fluoride ions and triethanolamine for a sufficient time to form a chemical conversion film on the aluninium or its alloy, wherein said immersion is conducted at a temperature not lower than 80° C. for a time of at least 10 minutes, the concentration of the phosphate ions or the fluoride ions is in the range of 20–300 ppm, and the concentration of triethanolamine is in the range of 0.2–2 wt%.

2. A method according to claim 1, wherein the water contains phosphate and fluoride ions and triethanolamine.

3. A method according to claim 1, further comprising ions of a metal selected from copper, iron, cobalt, silver and a mixture thereof, said ions being present in the water in a concentration of the metal ions in the range of 5–100 ppm.

4. A method according to claim 3, wherein the water contains phosphate ions, fluoride ions, triethanolamine and ions of a metal selected from copper, iron, cobalt, silver and a mixture thereof.

5. A method according to claim 4, wherein the concentration of the phosphate ions is in the range of 10 ppm–200 ppm, the concentration of the fluoride ions is in the range of 10 ppm–100 ppm, and the concentration of the triethanolamine is in the range of 0.05–1.0 wt%.

6. A method for making a selective absorption film for solar energy on a substrate of aluminium or its alloy, the method comprising immersing the substrate in an aqueous solution which comprises 0.2 to 2 wt% of triethanolamine and at least one member selected from the group consisting of 20 to 300 ppm of phosphate ions and 20 to 300 ppm of fluoride ions as the active components thereby forming a chemical conversion film on the substrate.

7. A method according to claim 6, wherein said aqueous solution comprises 20 to 300 ppm of phosphate ions, 20 to 300 ppm of fluoride ions and 0.2 to 2 wt% of triethanolamine.

8. A method according to claims 6 or 7, wherein the immersion is conducted at a temperature not lower than 80° C. for a time of at least 10 minutes.

9. A method according to claims 6 or 7, further comprising 5–100 ppm of ions of a metal selected from the group consisting of copper, iron, cobalt, silver and a mixture thereof, said ions being present in the aqueous solution.

10. A method according to claim 6, wherein said aqueous solution comprises 10–200 ppm of phosphate ions, 10–100 ppm of fluoride ions, 0.05–1.0 wt% of triethanolamine and 5–100 ppm of ions of a metal selected from the group consisting of copper, iron, cobalt, silver and a mixture thereof.

* * * * *